(No Model.)
L. A. PINKSTON.
AIR BRAKE.
No. 501,359. Patented July 11, 1893.
4 Sheets—Sheet 1.
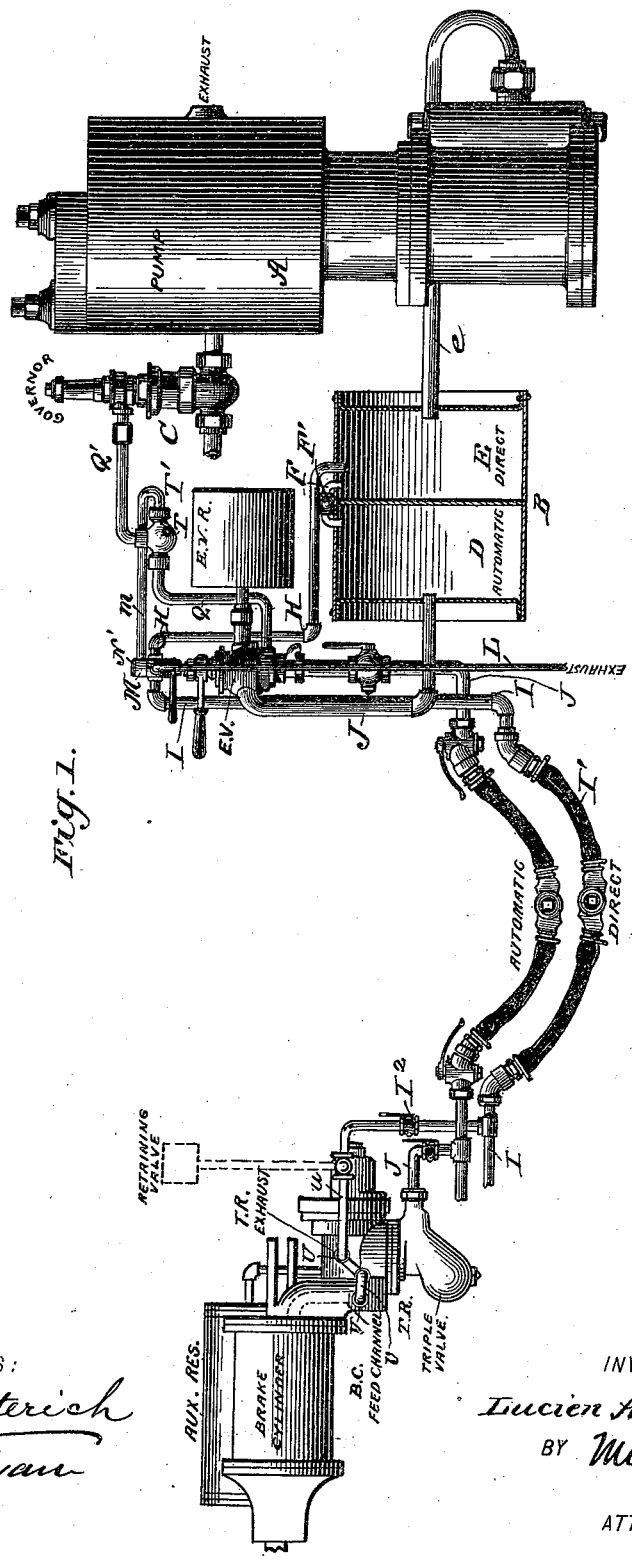
WITNESSES:
Fred G. Dieterich
Jos. A. Ryan
INVENTOR:
Lucien A. Pinkston.
BY
ATTORNEYS

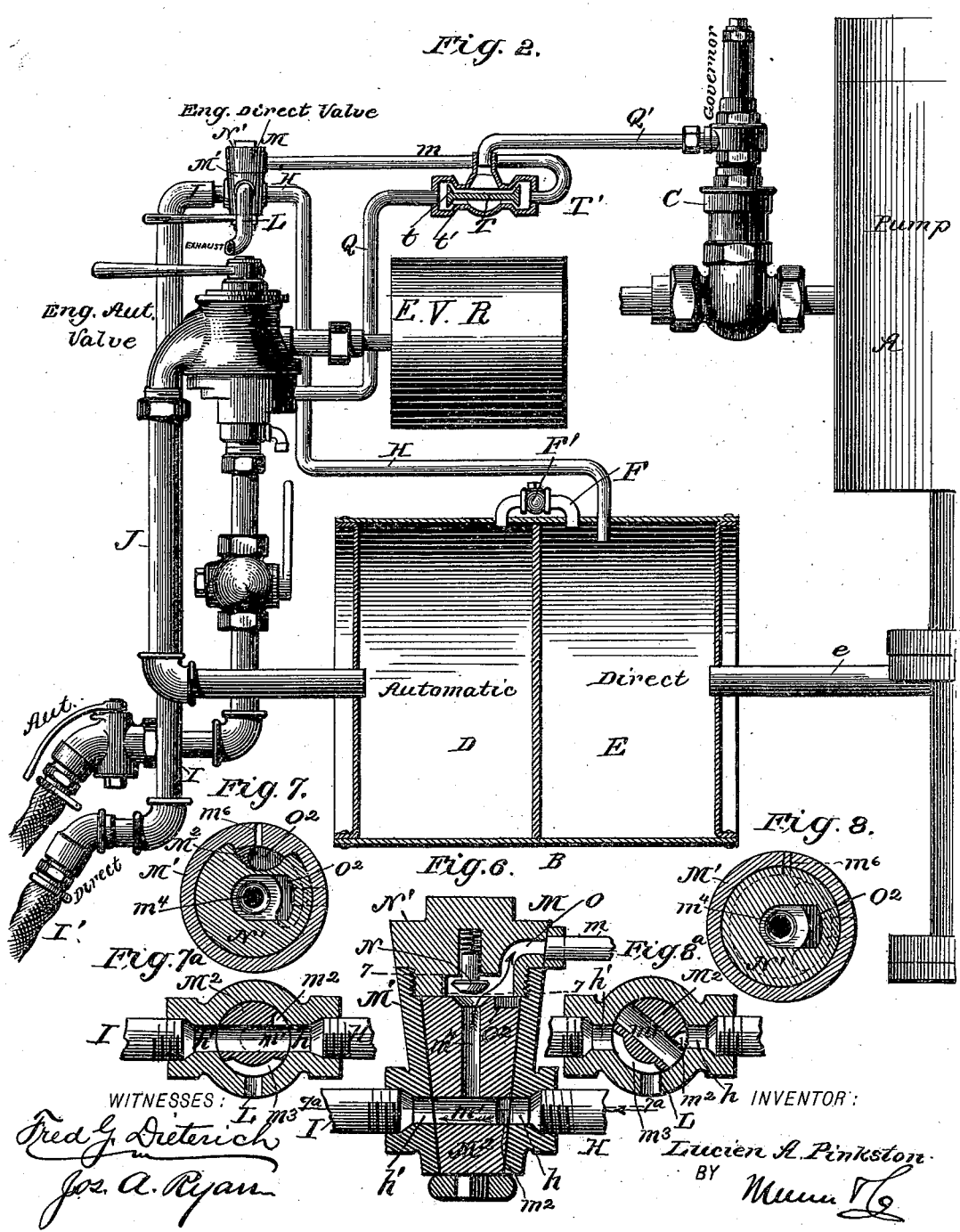

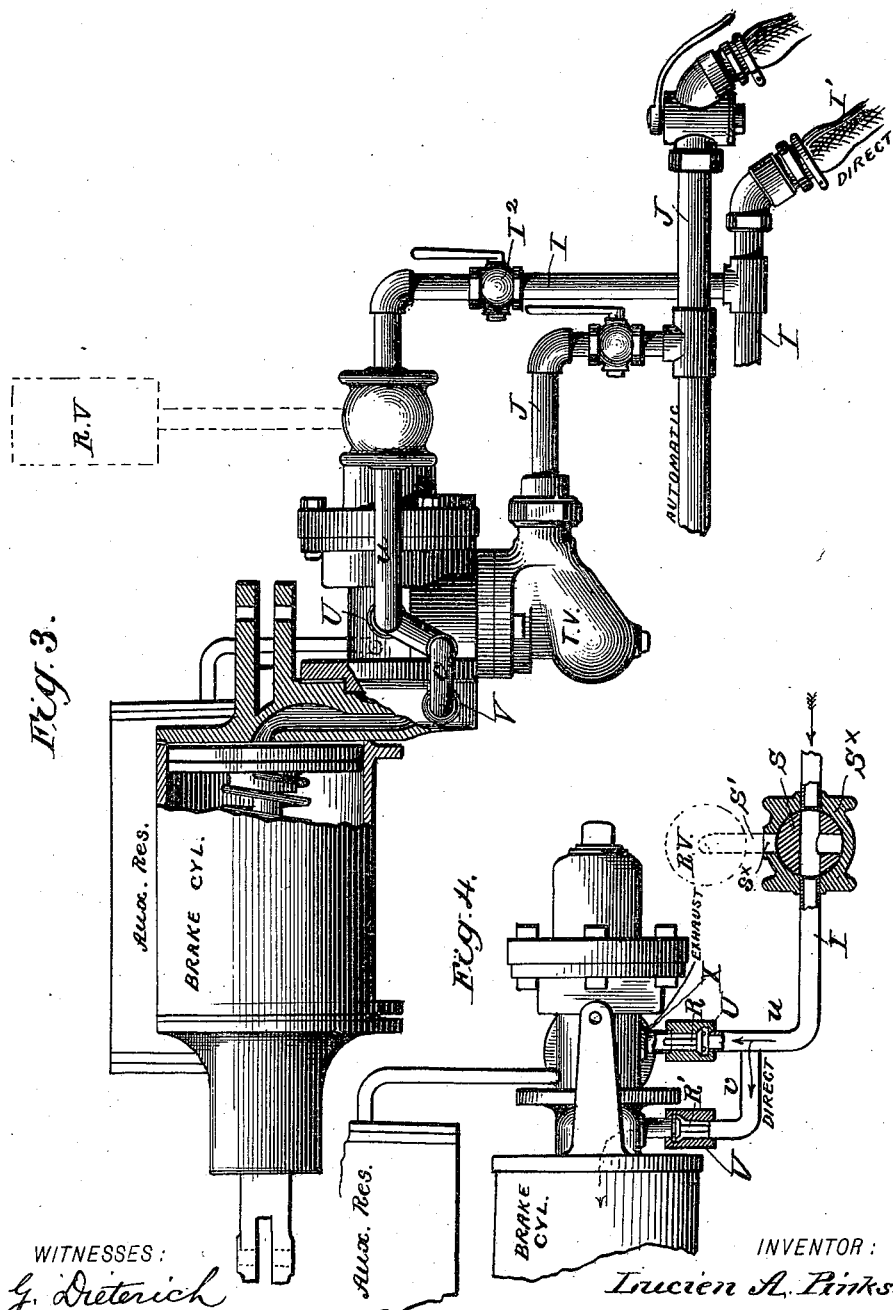

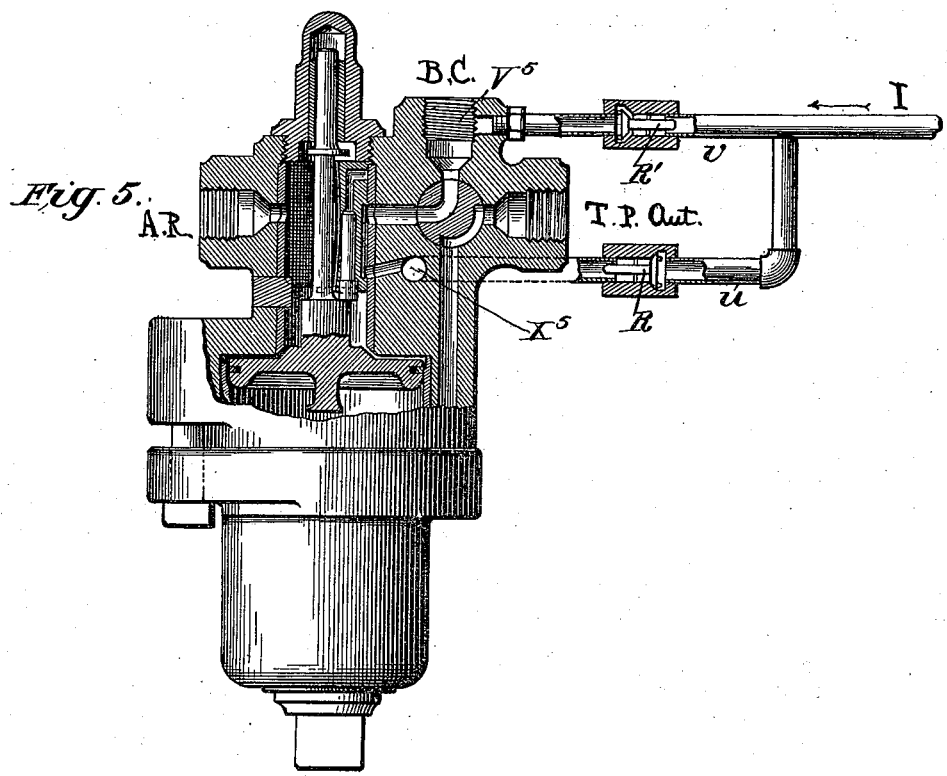

UNITED STATES PATENT OFFICE.

LUCIEN A. PINKSTON, OF CORSICANA, TEXAS, ASSIGNOR OF ONE-HALF TO FRED S. BROOKS, OF SAME PLACE.

AIR-BRAKE.

SPECIFICATION forming part of Letters Patent No. 501,359, dated July 11, 1893.

Application filed May 13, 1892. Serial No. 432,903. (No model.)

*To all whom it may concern:*

Be it known that I, LUCIEN A. PINKSTON, residing at Corsicana, in the county of Navarro and State of Texas, have invented certain new and useful Improvements in Air-Brakes, of which the following is a specification.

My invention relates more especially to a direct air brake system adapted to be used in combination with an automatic system, whereby the brakes can be applied by either the automatic or quick system, or the direct, or by both, as the conditions may require.

In the accompanying drawings I have shown my improved direct air brake system combined with the Westinghouse automatic system, for which my improvements are more particularly adapted.

In the Westinghouse automatic system, it is well known that, when descending long grades it is necessary for the brakeman to pass over the tops of the cars, at the top of the grade, to set the several retaining valves, to hold back a certain brake pressure in the brake cylinders, while the auxiliary reservoirs are being recharged, and again necessary for him to pass over the cars to readjust the valves at the end of the grade, so as to allow a full discharge of air from the brake cylinders, after releasing the brake pressure. Furthermore in such automatic system no air can pass into the auxiliary reservoirs while the brakes are held applied. Hence if from any cause, all the air in the auxiliary reservoirs, should be exhausted, the brakes must necessarily be released to recharge such reservoirs.

To provide means whereby the necessity of the brakeman passing over the cars to set the retaining valves and the use of such valves can be avoided, is one of the objects of my invention, which has also for its object to provide a brake system in which the brake pressure can be controlled by the engineer, and a positive pressure maintained on all grades, while the auxiliary reservoirs are being recharged.

A further object is, to provide for equalizing the pressure in all the brake cylinders regardless of the piston travel, whereby to set the brakes on all the cars in the train alike, and whereby a standard pressure can be maintained in all the auxiliary reservoirs, to keep them always in readiness for emergencies.

With other minor objects all of which will hereinafter be fully set forth, my invention consists in the peculiar combination and novel arrangement of parts, all of which will hereinafter be fully described in the specification and pointed out in the claims, reference being had to the accompanying drawings, in which—

Figure 1 is an elevation, partly in section, of my improved air brake apparatus. Fig. 2 is a similar view on an enlarged scale of the pump and main reservoir, the pump governor, engineer's valves, the main automatic brake pipe, the direct air pipe, and their several connections with the engineer's valves and the main reservoir. Fig. 3 is a side view on an enlarged scale illustrating what is known as the Westinghouse quick action brake apparatus, with my improved direct pipe connections combined therewith. Fig. 4 is a plan view thereof partly in section. Fig. 5 illustrates the plain triple valve and the direct pipe connection therewith. Fig. 6 is a vertical section of the engineer's direct valve, showing it set to apply the brakes. Figs. 7—$7^a$ are horizontal sections, taken respectively on the lines 7—7 and $7^a$—$7^a$ on Fig. 6, illustrating the relative arrangement of the several parts of such direct valve when set to "apply" and Figs. 8 and $8^a$ are similar views taken on the lines 7—$7^a$ showing the several parts of the direct valve, when set to "release."

As the engineer's valve, the pump, the governor, main train pipe, the triple valve and brake cylinder reservoirs, are constructed arranged and operated under what is known as the "Westinghouse automatic brake system" (for which my improvements are the more especially adapted) such automatic devices will hereinafter be referred to in a general way only. It should be stated however, that such automatic mechanism is operated in the usual manner, when it is to be used independent of the direct appliances connected therewith.

Referring to the drawings A indicates the air pumps, E. V and M the engineer's valves, E. V. R. the engineer's brake valve reservoir, in which the engineer's valve air pressure is retained, and C the governor, which is connected with and operated by the varying pressure in the main reservoir, in the usual manner.

B indicates the main reservoir, which in the present instance is formed into two compartments D and E one of which D, supplies the main or automatic brake pipe J and the other E, the direct supply pipe H, such compartment E being connected to the pump by the supply pipe $e$.

F indicates a pipe connection between the compartments D and E, which connection is provided with a check valve F′ which acts as a back pressure valve, to maintain a standard pressure in the automatic reservoir D, as the pressure in the direct reservoir is reduced.

It should here be stated, that the air as it discharges from the pump, enters the compartment E and there it passes through the pipe connection F into the compartment D, the air being stored up in the two compartments until the pressure in both compartments is equal, which in practice is usually ninety-five pounds to the square inch.

The direct reservoir pipe H communicates with the engineer's direct brake valve M, and such valve M, is also connected by the pipe $m$ with the pipe Q, through a double check valve chamber T′, which connects the engineer's automatic brake valve E. V, with the governor C, for a purpose presently explained; and such pipe $m$ is fed from the reservoir compartment E, in the manner most clearly shown in Figs. 7—7$^a$ and 8—8$^a$ of the drawings.

By reference to the aforesaid figures of the drawings, it will be seen that the direct reservoir pipe H, connects with the engineer's direct valve at $h$, at one side, while the direct train pipe I connects therewith at the opposite side, at $h'$, the casing M′ of such valve being also formed with an exhaust port L as shown. The plug or valve proper M$^2$ has a transverse channel way $m'$ arranged in the same horizontal plane with the ports $h$ $h'$ and L, such channel way $m'$ (which has a lateral enlargement $m^2$) being however normally held out of alignment with the opposite ports $h$ $h'$ (see Fig. 8) and such plug or valve M$^2$ is also formed with an escape passage $m^3$ normally in communication with the escape port L and the direct train pipe I.

$m^4$ indicates a vertical passage in the plug M$^2$ which communicates at its lower end with the channel way $m'$ its upper end having a valve seat over which operates a back pressure valve N, held for operation in the cap plate N′, such valve in practice being constructed to hold back a twenty-five pounds pressure.

T indicates a double acting check valve, located in a valve chamber T′, which connects the pipes Q and $m$, and the governor pipe Q′, such valve being held balanced so long as the pressure in pipes $m$ and Q remains at seventy pounds, such pressure being present in such pipes so long as the pressure in the reservoirs D and E is up to the standard or ninety-five pounds; the pressure in the pipe $m$ being reduced to seventy pounds by the back pressure valve N, while the pressure in the automatic pipe Q is similarly reduced through the medium of the reducing valve in the engineer's automatic valve, in the usual manner.

In the top of the plug or valve M$^2$ is formed a shallow channel way O$^2$, which is out of communication with a small bleeding off port $m^6$ in the shell M′ when the valve is in the position shown in Fig. 8 or at release position.

By providing the channelway $m'$ with an enlargement $m^2$, such enlargement will be in register with the inlet port $h$ when the valve M$^2$ is set to close off the pipe H from the direct pipe I, and an open communication established between the compartment E, and the pipe $m$, the ninety-five pounds pressure in the compartment being however reduced to seventy pounds in the pipe $m$ by the valve N as before stated. When the valve M$^2$ is in the position last described the escape passage $m^3$ will be in communication with the port $h'$ and exhaust L, and when in this position such port and exhaust will be in position to allow the air from the brake cylinder to escape into the atmosphere, through the exhaust in the triple valve, the direct pipe I and the port $h'$ and exhaust L in the valve M.

In operation when it is desired to set the brakes by a direct application, the engineer shifts the direct valve plug M$^2$ to the position shown in Figs. 6 and 7$^a$, which brings the channel way $m'$ in register with both ports $h$ $h'$, and opens up a direct communication between the main pipe I and the reservoir compartment E, under a full head or ninety-five pounds pressure, and as the pressure is reduced in such compartment E, it is obvious, that the check valve F′ will serve to close off communication between the compartments D and E and retain air in the automatic reservoir D up to the maximum pressure. As the engineer's direct valve is turned to apply, the channel way O$^2$ will be brought into register with the bleeding off port $m^6$ (see Fig. 7) which allows a small portion of the air held under seventy pounds pressure in the pipe $m$ to escape, reducing, as it were, the pressure in such pipe slightly below seventy pounds.

It will be observed that as the pressure in such manner is reduced in the said pipe $m$ the seventy pounds air pressure in the pipe Q will immediately shift the valve T, and close its taper portion $t$ against the seat $t'$ in the chamber T′, to positively close off the governor from the automatic system, and opens up communication between it and the direct system, and by such connection, so soon as the pressure in such direct system is reduced below standard, the governor is affected and sets the pump to work to restore the pressure in the compartment E.

The direct pipe I which is provided with the usual hose couplings I' and stop cocks I², is also provided with branch pipes $u$, $v$ one of which $u$ connects with exhaust port X of the triple valve, while the other $v$ opens into said valve to discharge direct into the brake cylinder discharging port.

Referring now more particularly to Figs. 2 and 4 it will be noticed that the pipes $u$ and $v$ have valve chambers U and V, in which are disposed oppositely movable valves R R', the valve R being held closed on a direct application of air through the triple valve, to close off the exhaust of such triple valve, while the valve R' operates to prevent the escape of air from the triple valve when the automatic pressure is applied.

The operation of my improved air brake system is as follows: Assuming the automatic and direct reservoirs D and E are holding air up to the standard pressure, and it is desired to apply the brakes by the automatic system, the engineer sets his automatic valve to "apply" to reduce the pressure in the main train pipe, the triple valve then operating in the usual manner. In order to release the brakes, the main pipe is put in communication with the reservoir D through the engineer's automatic valve which restores the pressure in the main pipe to standard, and as the pressure in the reservoir D is reduced, it is immediately restored from the reservoir E, and as the pressure in such reservoir E is reduced, it will affect the governor which in turn will start the pump to work to recharge such reservoir E. As before stated, the direct train pipe is connected with the exhaust of the triple valve and as the engineer's direct valve is normally set to the position shown in Figs. 8—8ª, it will be readily seen that the exhaust air from the brake cylinder through such triple valve, when the brakes are released after setting by the "automatic means" will escape through the exhaust port L, in the direct valve M. When it is desired to set the brakes by a direct application, the engineer's direct valve M is set to open up a communication from the compartment E to the train pipe I, from which the air discharges through the triple valve casing, into the brake cylinder, the pressure against the valve R closing off the exhaust port of such triple valve (see Fig. 4). After the direct application, to release the brakes, the direct valve M is set to release, which allows the air in the brake cylinder to escape through the exhaust port of the triple valve, which at this time is in its normal position, by reason of the automatic train pipe pressure, (the valve R being opened by such back pressure and the valve R' closed) back into the pipe I, and out to the atmosphere through the passage $m^3$ and port L in the valve M. If an old style of triple valve is used, the pipe I and the valved laterals $u$ and $v$ are connected therewith in the manner most clearly shown in Fig. 5, Sheet 4. In this case the pipe $u$ communicates with the exhaust $X^5$ and the pipe V, with the brake cylinder pipe $V^5$.

By providing the double valve mechanism T, should the direct pressure be used, the reduced pressure in the reservoir compartment E, would cause the pump to work, the same as it would, were the pressure reduced in the automatic train pipe, as the double valve will be thereby shifted to close off the pipe $m$ retaining as it were, the seventy pounds pressure in the automatic train pipe, and as during such operation the check valve F' is also closed, the regular pressure of ninety-five pounds will be maintained in the reservoir D, so that there will be always a sufficient pressure in reserve to supply the automatic system when necessary. As the pump resupplies the reservoir E, and the pressure exceeds seventy pounds in the pipe $m$, the valve T will be shifted to close off the governor from the reservoir E and opens up communication between such governor and the automatic pipe Q and places the automatic system in its usual normal condition.

In some instances, especially so where retaining valve mechanisms are not used in connection with the automatic system, and where it is desirable to employ retaining valves, I employ such valves, and connect them to the direct pipe I as most clearly shown in Figs. 3 and 4. By reference to such figures it will be noticed a three way cock S is located in the pipe I, the chamber $S^X$ of which has a supplemental opening $s^x$, to which is joined the pipe S', to which is connected the retaining valve R. V. which valve is of the ordinary Westinghouse type. By this construction it will be readily seen that after the brakes have been applied by either the automatic or the direct means, the cock S can be adjusted to hold back a predetermined pressure, to hold the brakes applied. It is obvious however, that the cock S must be readjusted before the direct system can be again applied.

From the foregoing description taken in connection with the drawings it will be readily seen that the engineer can regulate the pressure in the brake cylinders as little or as much as he pleases, which is almost an impossibility with the automatic brake. Furthermore by my improved system the cylinders will not leak off while the pump restores the reservoirs.

The auxiliary reservoirs for the automatic appliances can be thoroughly charged for emergencies, and can be applied on the top of a direct air application if necessary with better effect than if there were no direct application on, such operation being rendered possible whenever the straight air pressure is below the pressure in the auxiliary cylinder, as for instance, should a straight air application of say about twenty pounds pressure be on to steady the train when on a heavy down grade, and it should be necessary to apply the automatic pressure the engineer by properly shifting his automatic valve, will open up through the triple valve communication between the brake cylinder and the auxiliary reservoir, and thereby allow the seventy pounds pressure in such auxiliary reservoir to flow in the brake cylinder onto the twenty pounds direct pressure.

By the use of my improvements the engineer can leave his engine with brakes applied without cutting out the pump governors, and the brakes can be applied for the purpose of slackening the speed of the train, and especially in steadying trains when descending long grades, more positively and effectively than can be done by the automatic brake alone. Finally in descending long grades, the direct pressure can be applied at the start, and the automatic brake used on top of it, when desired, or one can be used while the pressure on the other is being restored.

Having thus described my invention, what I claim, and desire to secure by Letters Patent, is—

1. A fluid pressure brake mechanism, comprising an automatic system, including the automatic reservoir compartment, the automatic train pipe, the engineer's automatic valve, and a triple valve, a direct reservoir compartment, a direct train pipe arranged to discharge into the triple valve casing, an engineer's valve in the said direct pipe connected with the direct reservoir, the pump discharging into such direct reservoir, the pump governor and mechanism operated by the reduction of pressure in the direct system for holding the pressure in the automatic system to standard pressure during the application of the direct pressure substantially as set forth.

2. A fluid pressure brake mechanism, comprising the brake cylinder, the auxiliary reservoir, the triple valve, the automatic train pipe, the direct train pipe having laterals, one communicating with the brake cylinder feed channel, and the other with the exhaust of the triple valve, such laterals having oppositely moving valves, and means for varying the air pressure in the automatic or direct train pipe, whereby to apply the brakes either by automatic or direct system, all substantially as and for the purposes described.

3. The combination in a fluid pressure brake system, of the automatic and direct train pipes, an engineer's valve, the pump, the automatic and direct reservoir compartments, the direct compartment connected with the pump, a supply pipe connecting the direct with the automatic reservoir compartment, having a back pressure valve, a double acting governor valve connected with the engineer's automatic valve, and an engineer's valve connected with direct pipe and direct reservoir compartment, and with the double acting governor valve, constructed to equalize the direct pressure against such valve to that of the automatic pressure thereagainst, and to provide for a reduction of such pressure when adjusted to apply, to lead the under standard pressure into the direct pipe, all substantially as and for the purpose described.

4. In a fluid pressure brake system, the combination with the pump governor, the double acting governor valve, of the automatic and the direct train pipes, the main and direct reservoir compartments, the engineer's valves in said pipes connecting them with the said reservoir compartments, and with the double acting governor valve, the direct engineer's valve having a reducing mechanism adapted to equalize the direct air pressure against the said governor valve to that of the automatic pressure against it, and adapted when set to apply the brakes to allow such pressure to exhaust, whereby to admit of the adjustment of such governor valve to cut off the governor from the automatic pressure, all substantially as and for the purpose described.

5. In a fluid pressure brake system, the combination with the brake cylinder, the auxiliary reservoir, the triple valve, the automatic train pipe, the automatic and direct reservoirs, the engineer's automatic brake valve and the pump, of a direct train pipe connected with the triple valve casing at its brake cylinder feed end and having a back pressure valve for preventing air under automatic pressure from passing out of the triple valve into the direct pipe, a brake pipe connecting the direct pipe with the triple valve exhaust and having a direct pressure valve whereby to prevent the flow of air from the said direct pipe into the said exhaust, an engineer's valve in the direct pipe formed with a bleeding off channel normally in communication with the direct pipe and the atmosphere, whereby the exhaust from the triple valve will be released through such direct pipe, and mechanism for holding the air under standard pressure in the automatic pipe when the direct pressure is in the direct pipe all substantially as shown and for the purpose described.

6. An air brake system, comprising an automatic system and a direct system, the train pipe of the latter having a three way valve, and connected to the exhaust of the triple valve of the automatic system, whereby to release the air through the three way valve when the brakes are released by the automatic system, the direct reservoir compartment adapted to hold air under standard pressure, connected with the direct train pipe and supplied from the pump, the automatic reservoir compartment, for supplying air to the automatic pipe, said automatic reservoir compartment being supplied from the direct reservoir compartment, a check valve for holding the pressure in the said automatic reservoir compartment, when pressure is reduced in the direct reservoir compartment, a double acting valve in the pump governor pipe operated to hold the pressure in the automatic train pipe when the direct system is used, all arranged substantially as and for the purposes described.

LUCIEN A. PINKSTON.

Witnesses:
 JINK EVANS,
 C. S. WEST.